United States Patent Office 2,957,001
Patented Oct. 18, 1960

2,957,001

PROCESS FOR PREPARING FLUORINE-CONTAINING ORGANIC COMPOUNDS

William Channing Smith, Wilmington, Del., assignor to E. I. du Pont de Nemours and Company, Wilmington, Del., a corporation of Delaware No Drawing. Filed Nov. 27, 1957, Ser. No. 699,159

18 Claims. (Cl. 260—293)

This invention relates to a new method for preparing fluorine-containing organic compounds.

Organic compounds which contain fluorine have achieved technical importance in recent years because they possess an unusual combination of properties. They are frequently highly resistant to oxidative decomposition and have excellent thermal stability. They have found a broad spectrum of uses which range from refrigerants and propellants for aerosols to lubricants for high temperature application. Simple and economical methods which can be used to obtain fluorinated compounds are, therefore important. Present processes for introducing fluorine into compounds usually employ reactants which are highly corrosive or are not readily accessible and frequently yield considerable quantities of undesirable by-products.

The novel process of the invention produces fluorine-containing compounds by reacting sulfur tetrafluoride ($SF_4$) with an organic compound which contains one and only one sulfur atom doubly bonded to one carbon, the remaining atoms on said carbon being singly bonded thereto. Thus the organic compound reactant contains a thiocarbonyl group, that is a $>C=S$ group, in which group two of the valences of the carbon are satisfied by singly bonded atoms. In the process the thiocarbonyl group is converted to a difluoromethylene group ($>CF_2$).

In the principal form of the invention, sulfur tetrafluoride is reacted with an organic compound containing one and only one sulfur atom doubly bonded to one carbon, the remaining atoms on said carbon being singly bonded thereto and selected from halogens, sulfur and elements of atomic numbers of 6 to 8 inclusive, that is, carbon, nitrogen and oxygen.

The compounds are defined by the structure

where A and B are selected from halogens of atomic number 9 through 35 and organic radicals bonded to the carbon of the thionyl group through carbon, nitrogen, oxygen or sulfur. Typical classes of thiocarbonyl compounds, with specific examples in brackets, which can be used in the process are thioketones (thioacetophenone), thiocarbonyl halides (thiobenzoyl chloride), thio-amides (N,N-dimethylthiostearamide), dithiocarbamates (ethyl ester of diethyldithiocarbamic acid), thionocarbamates (ethyl ester of thionocarbamic acid), thiuram monosulfides (tetrabutylthiuram monosulfide), thiuram disulfides (tetraoctylthiuram disulfide), xanthates (cyclohexyl butylxanthate), thiobisthionoformates (dibutyl ester of thiobisthionoformic acid), dithiobisthionoformates (diethyl ester of dithiobisthionoformic acid), and trithiocarbonates (dibutyl trithiocarbonate).

In the operation of the process, the doubly bonded sulfur of the thiocarbonyl group is replaced by two fluorine atoms. Additional fluorine atoms can be and frequently are introduced into the organic reactant during the process. The characteristic feature, however, of the invention is the replacement of the doubly bonded sulfur by two fluorine atoms. The ideal reaction of the thiocarbonyl compound and sulfur tetrafluoride is represented by the following equation in which all of the fluorine is found in the desired fluorine-containing compound and an easily separated by-product, sulfur, is obtained.

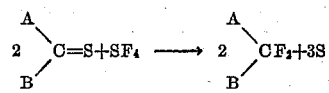

Since the principal reaction in the process is the replacement of the doubly bonded sulfur by two fluorine atoms the nature of the groups bonded to the thionyl carbon is not critical. These groups, if organic, can be aliphatic, cycloaliphatic, aromatic or heterocyclic in character. Although we prefer to use thiocarbonyl compounds which are free of reactive groups other than thiocarbonyl, compounds which contain additional reactive groups are operable in the process but will require additional quantities of sulfur tetrafluoride.

Preferred compounds are selected from the groups whose structures are shown below wherein X represents fluorine, chlorine or bromine and R is an organic radical.

Thiocarbonyl dihalides

Thiocarbonyl monohalides

Thioketones

Thiuram monosulfides

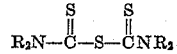

Thiuram disulfides

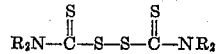

Xanthates

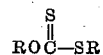

Trithiocarbonates

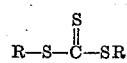

The R groups can be alike or different and can be aliphatic, cycloaliphatic, aromatic or heterocyclic in character. For reasons of availability compounds in which the R groups contain at most 18 carbon atoms are preferred. The R groups can be oxygen or sulfur interrupted hydrocarbon radicals.

Commercial grade chemicals can be used in the process. Sulfur tetrafluoride can be obtained by processes described in the literature (Brown and Robinson, J. Chem. Soc. 1955, 3147–51).

The reaction is conducted under substantially anhydrous conditions, preferably in the absence of oxygen, in either a batch or continuous flow process. In either process the reaction chamber is preferably made of material resistant to chemical attack by hydrogen fluoride, for example, stainless steel or platinum. In a batch process, a vessel capable of withstanding pressure is preferably flushed with an inert gas, for example, nitrogen, to displace the air and is then charged with the thiocarbonyl compound. The pressure vessel is cooled, evacuated and sulfur tetrafluoride is then added to the cooled chamber. The vessel is sealed and the reaction is conducted under predetermined conditions.

The conditions under which the reaction is run to obtain maximum yield of product are determined to some extent by the chemical reactivity and thermal stability of the reactants and of the fluorine-containing products formed in the reaction.

The mole ratio of sulfur tetrafluoride to each thiocarbonyl group in the compound being fluorinated is not critical but is preferably not less than 1 to 2 or more than 6 to 1. For economic reasons it is preferable to use quantities of reactants in the approximate molar ratio that is shown by the chemical equation for the reaction. It is not essential, however, for operability of the process that theoretical molar ratios be used since any unreacted materials can be recovered and reused. With thiocarbonyl compounds of low reactivity, a considerable excess of sulfur tetrafluoride can advantageously be used.

To avoid formation of undesirable by-products, the temperature of the reaction is kept as low as operability permits. Generally, the reactants are heated slowly while being agitated, the heating being conducted by a stepwise procedure wherein the reactants are maintained for short periods of time at progressively higher temperatures. This procedure permits smooth operation of the process and avoids sudden increases in pressure in the reaction vessel. However, this procedure is not essential for operability and the reactants can, if desired, be heated in one step to the reaction temperature.

The reaction temperature will vary with the reactivity of the thiocarbonyl compound but will generally lie between about 50° C. and 400° C. Excessively high temperatures are not needed and offer no advantages. The preferred temperature range, that is, the range in which most thiocarbonyl compounds react to give satisfactory yields of organic fluorine compounds, lies between about 60° C. and about 300° C.

The pressure employed in a batch process is generally autogenous. This pressure is generally between about 5 and 50 atmospheres but pressures outside this range are operable. The reaction time is not critical. Generally in a batch process the materials are permitted to react from about 2 to about 48 hours. During the reaction period the contents of the reaction vessel are preferably mixed, for example, by mechanical stirring or shaking.

The fluorination can be carried out advantageously although not necessarily in the presence of antimony halides or of fluoride ion acceptors. Examples of fluoride ion acceptors useful in this reaction are hydrogen fluoride, boron trifluoride, arsenic trifluoride, phosphorus pentafluoride, titanium tetrafluoride and silicon tetrafluoride. Only small amounts of these compounds are used, for example, from 0.01 to 1.0% by weight of the sulfur tetrafluoride. The use of a small quantity of fluoride ion acceptor can result in improved yields of organic fluorine compounds and reduce the length of time and the temperature employed in the reaction. Arsenic trifluoride and hydrogen fluoride are preferred fluoride ion acceptors.

The process of the invention can also be conducted by a continuous flow method wherein sulfur tetrafluoride and the thiocarbonyl compound are passed into a reaction tube which is heated to a temperature sufficient to effect reaction. Generally, higher temperatures are needed in a continuous flow process than in a batch process since the former process is normally conducted at atmospheric pressure.

Various modifications can be made in the process described. Thus inert solvents can be used to dissolve solid reactants and to modify the vigor of the reaction where highly reactive chemicals are used. Suitable solvents are benzene, hexane, octane, cyclohexane and perfluorinated compounds such as, perfluorocyclohexane.

The products of the reaction are collected and purified by conventional procedures. For example, if the products are gaseous, they are collected in corrosion-resistant vessels which are cooled to a low temperature with, for example, liquid nitrogen or liquid helium. These products can then be purified by known methods such as distillation through a low temperature fractionation unit. Products which are liquids or solids at normal atmospheric temperatures can be purified by fractional distillation at atmospheric or reduced pressure or by crystallization.

The following examples, in which quantities are expressed as parts by weight, illustrate the process of the invention.

Example I

A bomb (capacity, 145 parts of water), lined with "Hastelloy,"[1] is flushed with nitrogen and charged with 19 parts of bis(1-piperidylthiocarbonyl)disulfide. The charged bomb is cooled in a solid carbon dioxide-acetone mixture and evacuated to about 5–10 mm. pressure. It is then charged with 21 parts of sulfur tetrafluoride. The mole ratio of the disulfide to sulfur tetrafluoride is about 1 to 3.2. The bomb is closed and heated at 50° C. for 2 hours, at 90° C. for 4 hours and at 120° C. for 4 hours. After cooling to room temperature and venting the bomb, there is obtained 22 parts of a mixture of a tan solid and yellow liquid. The liquid is decanted and fractionally distilled to obtain N-trifluoromethylpiperidine in 41% yield, B.P., 70° C./210 mm.

*Analysis.*—Calc'd for $C_6H_{10}NF_3$: C, 47.05; H, 6.58; N, 9.15; F, 37.22. Found: C, 48.37; H, 6.76; N, 8.42; F, 36.16.

The process of Example I is repeated except that the reactants are heated for 6 hours at 100° C. There is obtained a 76% yield of N-trifluoromethylpiperidine.

Example II

Using a bomb and procedure similar to that described in Example I, a mixture of 29 parts of tetraethylthiuram disulfide and 32 parts of sulfur tetrafluoride is heated for 2 hours at 50° C., 4.5 hours at 90° C. and 4 hours at 120° C. The molar ratio of disulfide to sulfur tetrafluoride is about 1 to 3. There is obtained 37 parts of a mixture of a tan solid and yellow liquid. The liquid is separated by filtration and fractionally distilled to give 10.8 parts of N-trifluoromethyldiethylamine, B.P., 73–75° C.

The above process is repeated except that a mixture of 45 parts of tetraethylthiuram disulfide and 50 parts of sulfur tetrafluoride is used. There is obtained N-trifluoromethyldiethylamine which analyzes as follows:

*Analysis.*—Calc'd for $C_5H_{10}F_3N$: C, 42.55; H, 7.14; F, 40.42; N, 9.93. Found: C, 43.73; H, 7.56; F, 38.66; N, 8.97.

Example III

Using a bomb and procedure similar to that described in Example I, a mixture of 21 parts of tetramethylthiuram monosulfide, 35 parts of sulfur tetrafluoride and 0.5 part of arsenic trifluoride is heated for 2 hours at 120° C. and for 6 hours at 150° C. The mole ratio of monosulfide to sulfur tetrafluoride is about 1 to 3.2. There is obtained 40 parts of a volatile product which is collected in a stainless steel cylinder cooled in liquid nitrogen. This product is shown by mass spectrometry to contain at least 15–20 mole percent of N-trifluoromethyldimethylamine. This compound is volatile at room temperature, that is, about 25° C.

Examples I, II and III illustrate the process as applied to thiocarbonyl compounds in which the carbon of the thiocarbonyl group is singly bonded to nitrogen and to

---

[1] The "Hastelloy" of this specification is "Hastelloy" C, a well-known chemically-resistant alloy of nickel, iron and molybdenum.

sulfur. These compounds are referred to as thiuram mono- and disulfides or as bis(mono- and disubstituted thiocarbamoyl)mono- and disulfides. Additional examples of this class which are operable are bis(morpholinothiocarbonyl)disulfide, tetracyclohexylthiuram disulfide, tetraisobutylthiuram disulfide, tetraisooctenylthiuram disulfide, and tetradodecylthiuram monosulfide.

The resulting compounds are generally colorless liquids or low melting solids which decompose slowly in the presence of moisture to release hydrogen fluoride. They are useful as etching agents for glass and other metal surfaces which are attacked by hydrogen fluoride. The depth of etching can be readily controlled since the rate of release of hydrogen fluoride is slow. For example, a design is etched on a glass surface by brushing it with N-trifluoromethylpiperidine, allowing it to stand for 2 hours in the air and removing the fluorinated compounds by washing with acetone.

The compounds are soluble in a wide range of organic solvents including acetone, diethyl ether, hexane, benzene and gasoline.

*Example IV*

Using a bomb and procedure similar to that described in Example I, a mixture of 34 parts of ethylene trithiocarbonate and 33 parts of sulfur tetrafluoride is heated for 2 hours at 50° C. and for 8 hours at 80° C. The mole ratio of trithiocarbonate to sulfur tetrafluoride is 1 to 1.22. After cooling and venting the volatile products, there remains 43.5 parts of a mixture of liquid and solid. The mixture is slurried with about 20 parts of anhydrous diethyl ether and filtered to remove insoluble material. The filtrate is distilled to give 11.5 parts of 2,2-difluoro-1,3-dithiolane, B.P. 35–37° C./3 mm. This product has the following structure:

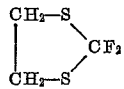

The identity of the product is confirmed by the nuclear magnetic resonance spectrum and by elemental analysis.

*Analysis.*—Calc'd for $C_3H_4F_2S_2$: C, 25.44; H, 2.83; F, 26.72; S, 45.10. Found: C, 26.95; H, 3.12; F, 24.96; S, 44.85

The compound, 2,2-difluoro-1,3-dithiolane, decomposes rapidly when stored in glass bottles but can be kept satisfactorily in bottles fabricated from polyethylene or polytetrafluoroethylene

*Example V*

Using a bomb and procedure similar to that described in Example I, a mixture of 15.9 parts of bis(trifluoromethyl)trithiocarbonate and 16 parts of sulfur tetrafluoride is heated for 2 hours at 130° C., 4 hours at 170° C. and 4.5 hours at 200° C. The mole ratio of trithiocarbonate to sulfur tetrafluoride is about 1 to 2.3. There is obtained 8 parts of a volatile product which is shown by mass spectrometry to contain principally bis(trifluoromethyl) sulfides of the general formula $CF_3S_nCF_3$, where $n$ is a whole number whose value lies between 1 and 4 inclusive. There is also present a small quantity of 2,4-dithia-1,1,1,3,3,5,5,5-octafluoropentane.

Examples IV and V illustrate the process as applied to thiocarbonyl compounds in which the carbon of the thiocarbonyl group is singly bonded to each of two sulfur atoms, that is, trithiocarbonates. Additional examples of compounds of this class which are operable in the process are diheptyl trithiocarbonate, dicyclohexyl trithiocarbonate, di(α-naphthyl) trithiocarbonate, diphenyl trithiocarbonate, di(p-chlorophenyl) trithiocarbonate, and di(β-chloroethyl) trithiocarbonate.

*Example VI*

Using a bomb and procedure similar to that described in Example I, a mixture of 15 parts of ethyl ethylxanthate and 32 parts of sulfur tetrafluoride is heated for 2 hours each at 50° C., 80° C., 100° C. and 120° C. The mole ratio of xanthate to sulfur tetrafluoride is 1 to 3. There is obtained 16 parts of a volatile product which is collected in a stainless steel cylinder cooled in liquid nitrogen. This product is shown by mass spectrometry to contain ethyl trifluoromethyl ether and ethyl fluoride.

Example VI illustrates the process as applied to thiocarbonyl compounds in which the carbon of the thiocarbonyl group is singly bonded to oxygen and sulfur, that is, xanthates. Other examples of compounds of this class are butyl butylxanthate, ethyl octylxanthate, octyl cyclohexylxanthate, and methallyl cyclohexylxanthate.

*Example VII*

Using the procedure described in Example I, a mixture of 48 parts of thiophosgene ($CSCl_2$), 25 parts of sulfur tetrafluoride and 0.7 part of an approximately 1 to 1 mixture (by weight) of antimony trichloride-antimony pentachloride is heated for 4 hours at 150° C. There is obtained 27 parts of volatile products which are collected in a trap cooled with a solid carbon dioxide-acetone mixture. The volatile products are shown by gas chromatography to contain a substantial quantity of dichlorodifluoromethane ($CF_2Cl_2$) and a lesser quantity of chlorotrifluoromethane ($CF_3Cl$).

Example VII illustrates the process as applied to thiocarbonyl compounds in which the carbon of the thiocarbonyl group is singly bonded to a halogen, that is, thioacid halides. Other examples of this class of compounds are thiocarbonyl fluoride and thiobenzoyl chloride.

When thiobenzophenone is reacted with sulfur tetrafluoride by the procedure described in Example I, using a final reaction temperature of 150° C. and a hydrogen fluoride catalyst there is obtained in good yield diphenyldifluoromethane. This example illustrates the application of the process to a thiocarbonyl compound in which the carbon of the thiocarbonyl group is singly bonded to two carbon atoms. Examples of other compounds of this class are di-n-butyl thioketone, ethylhexyl thioketone, and thioacetophenone.

From the above examples, it is clear that the process of the invention is generic to the reaction of sulfur tetrafluoride with organic compounds which contain a thiocarbonyl group in which a carbon is doubly bonded to one and only one sulfur, the remaining valences of said carbon being satisfied by singly bonded elements.

I claim:

1. The process for the preparation of organic fluorine compounds which comprises reacting sulfur tetrafluoride with an organic compound containing one sulfur atom doubly bonded to one carbon, the remaining atoms on said carbon being singly bonded thereto, under substantially anhydrous conditions and at a temperature of about 50–400° C.

2. The process for the preparation of organic fluorine compounds which comprises reacting sulfur tetrafluoride with a thioketone under substantially anhydrous conditions and at a temperature of about 50–400° C.

3. The process for the preparation of organic fluorine compounds which comprises reacting sulfur tetrafluoride with a thiocarbonyl halide under substantially anhydrous conditions and at a temperature of about 50–400° C.

4. The process for the preparation of organic fluorine compounds which comprises reacting sulfur tetrafluoride with a trithiocarbonate under substantially anhydrous conditions and at a temperature of about 50–400° C.

5. The process for the preparation of organic fluorine compounds which comprises reacting sulfur tetrafluoride with a thiuram sulfide, under substantially anhydrous conditions and at a temperature of about 50–400° C.

6. The process for the preparation of organic fluorine compounds which comprises reacting sulfur tetrafluoride with a thiuram monosulfide under substantially anhydrous conditions and at a temperature of about 50–400° C.

7. The process for the preparation of organic fluorine compounds which comprises reacting sulfur tetrafluoride with a thiuram disulfide under substantially anhydrous conditions and at a temperature of about 50–400° C.

8. The process for the preparation of organic fluorine compounds which comprises reacting sulfur tetrafluoride with a xanthate under substantially anhydrous conditions and at a temperature of about 50–400° C.

9. The process for the preparation of organic fluorine compounds which comprises reacting sulfur tetrafluoride with an organic compound containing one sulfur atom doubly bonded to one carbon, the remaining atoms on said carbon being singly bonded thereto, said compound being selected from the group consisting of thioketones, thiocarbonyl halides, thiuram monosulfides, thiuram disulfides, xanthates, and trithiocarbonates, under substantially anhydrous conditions and at a temperature of about 50–400° C.

10. The process for the preparation of organic fluorine compounds which comprises reacting sulfur tetrafluoride under substantially anhydrous conditions with an organic compound containing one sulfur atom doubly bonded to carbon, the remaining atoms on sain cahbon being singly bonded thereto and selected from the group consisting of halogen, sulfur, and elements of atomic number 6–8 inclusive, under substantially anhydrous conditions and at a temperature of about 50–400° C.

11. The process which comprises reacting sulfur tetrafluoride with bis(1-piperidylthiocarbonyl) disulfide under substantially anhydrous conditions and at a temperature of about 50–400° C.

12. The process which comprises reacting sulfur tetrafluoride with tetraethylthiuram disulfide under substantially anhydrous conditions and at a temperature of about 50–400° C.

13. The process which comprises reacting sulfur tetrafluoride with tetramethylthiuram monosulfide under substantially anhydrous conditions and at a temperature of about 50–400° C.

14. The process which comprises reacting sulfur tetrafluoride with ethylene trithiocarbonate under substantially anhydrous conditions and at a temperature of about 50–400° C.

15. The process which comprises reacting sulfur tetrafluoride with bis(trifluoromethyl)trithiocarbonate under substantially anhydrous conditions and at a temperature of about 50–400° C.

16. The process which comprises reacting sulfur tetrafluoride with ethyl ethylxanthate under substantially anhydrous conditions and at a temperature of about 50–400° C.

17. The process which comprises reacting sulfur tetrafluoride with thiophosgene under substantially anhydrous conditions and at a temperature of about 50–400° C.

18. The process which comprises reacting sulfur tetrafluoride with thiobenzophenone under substantially anhydrous conditions and at a temperature of about 50–400° C.

References Cited in the file of this patent

UNITED STATES PATENTS

| | | |
|---|---|---|
| 2,193,415 | Coltof | Mar. 12, 1940 |
| 2,852,554 | England | Sept. 16, 1958 |